United States Patent
Shim

(10) Patent No.: US 6,304,235 B1
(45) Date of Patent: *Oct. 16, 2001

(54) IMPEDANCE MATCHING CIRCUIT AND DISPLAY DEVICE HAVING THE IMPEDANCE MATCHING CIRCUIT

(75) Inventor: Jae-Gyou Shim, Suwon (KR)

(73) Assignee: SamSung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/910,216

(22) Filed: Aug. 13, 1997

(30) Foreign Application Priority Data

Aug. 13, 1996 (KR) .................................. 96-33590

(51) Int. Cl.[7] ....................................... G09G 1/06
(52) U.S. Cl. ............................. 345/10; 345/112
(58) Field of Search ............................. 345/10, 11, 112, 345/204, 211, 212, 2, 326, 327; 333/293; 348/736; 514/531

(56) References Cited

U.S. PATENT DOCUMENTS

| 4,316,220 | * | 2/1982 | Muterspaugh et al. ............... 348/736 |
| 4,354,163 | * | 10/1982 | Kato et al. ............................. 333/293 |
| 4,468,701 | * | 8/1984 | Burcher et al. ....................... 514/531 |
| 5,268,676 | * | 12/1993 | Asprey et al. ............................ 345/2 |
| 5,666,658 | * | 9/1997 | Borchartdt et al. .................... 455/42 |
| 6,094,282 | * | 7/2000 | Hoda et al. ........................ 358/909.1 |

* cited by examiner

Primary Examiner—Steven Saras
Assistant Examiner—Fritz Alphonse
(74) Attorney, Agent, or Firm—Robert E. Bushnell, Esq.

(57) ABSTRACT

A display device has a video input unit for inputting video signals from an external device via a signal cable, a video amplifying unit for amplifying the video signals transmitted via the video input unit, and an impedance matching circuit connected between the video input unit and the video amplifying unit, for compensating for the decrease of the video signals. The impedance matching circuit includes: a first resistor connected to the video input unit; a capacitor connected in series with the first resistor and connected to the video amplifying unit; and at least two second resistors connected in series between a connecting point of the first resistor and capacitor and ground.

8 Claims, 7 Drawing Sheets

FIG. 6

| TYPE | IMPEDANCE CHARACTERISTICS | |
|---|---|---|
| | FREQUENCY < 200MHZ | 200MHZ < FREQUENCY < 230MHZ |
| FIG. 5A | ◎ | △ |
| FIG. 5B | ◎ | △ |
| FIG. 5C | ◎ | ○ |
| FIG. 5D | ◎ | ○ |
| FIG. 5E | ◎ | ◎ |
| FIG. 5F | ◎ | ○ |

◎ VERY GOOD
○ GOOD
△ NORMAL

IMPEDANCE MATCHING CIRCUIT AND DISPLAY DEVICE HAVING THE IMPEDANCE MATCHING CIRCUIT

CLAIM OF PRIORITY

This application makes reference to, incorporates the same herein, and claims all benefits accruing under 35 U.S.C. §119 from an application for IMPEDANCE MATCHING CIRCUIT EMBODYING HIGH FREQUENCY FEATURE AND DISPLAY DEVICE HAVING THE IMPEDANCE MATCHING CIRCUIT earlier filed in the Korean Industrial Property Office on Aug. 13, 1996 and there duly assigned Ser. No. 33590/1996, a copy of which application is annexed hereto.

BACKGROUND OF THE INVENTION

1. Field of the Invention

The present invention relates to an impedance matching circuit, and more particularly to an impedance matching circuit for stably embodying the signal of a wide band frequency range by compensating for the decreasing of the signal due to an RC time constant when supplying video signals input via a BNC or a D-SUB connector to a video amplifier and a display device having the impedance matching circuit.

2. Description of the Related Art

Typically, computer peripheral devices refer to various input/output devices connected to a computer system, such as a monitor, a printer, a CD-ROM, a plotter, etc.

A monitor widely used as a display device of a computer serves to convert input signals into image signals to enable a user to check the operation of the computer. It uses the principle that different amounts of electron beams which vary according to the strength of the image signal hit the fluorescent material of one color of red, green and blue covering the surface of a cathode ray tube (hereinafter referred to as a "CRT") to emit light of different brightness or different color.

To make a screen adequate to the CRT, the CRT should be properly adjusted to the display device. Generally, voltage and driving waveforms required to drive the monitor are needed. In addition, the monitor requires a mechanical structure to support CRT.

An earlier monitor normally includes a video input unit for inputting video signals generated by a video card in a computer and transmitted via a signal cable, a video amplifier unit for amplifying the video signals supplied via the video input unit and for transmitting them to a CRT, horizontal and vertical deflection circuits for respectively inputting horizontal and vertical synchronization signals transmitted via the signal cable and for performing horizontal and vertical deflection.

A display controller, e.g., a computer, is connected to a monitor via a signal cable for transmitting image and synchronization signals. A coaxial cable is typically used for the signal cable to suppress the radiation of electromagnetic waves and to prevent the signal from unnecessary attenuation.

When an image is output on the monitor by using the signal supplied from the computer, the computer may have various high frequency outputs and low frequency outputs corresponding to the frequency change according to the video card therein.

The signal cable disposed between the computer and the monitor includes a resistance component and a capacitance component.

The resistance and capacitance components together cause the signal and the signal cable to decrease depending upon the time constant of the resistance and capacitance elements. Accordingly, an impedance matching circuit for compensating for the signal decreasing due to resistance and capacitance elements is provided between the video input unit and a video amplifier.

The earlier impedance matching unit consisting of single resistance elements combined with a capacitance element, has a problem that while it can achieve a proper impedance matching effect when the video frequency band is below 200 mega-Hertz (MHz), the compensating effect is significantly reduced when the frequency band is over 200 mega-Hertz.

SUMMARY OF THE INVENTION

Accordingly, the present invention is directed to an impedance matching circuit that substantially obviates one or more of the problems due to limitations and disadvantages of the related art.

An object of the present invention is to provide an impedance matching circuit which can compensate for the wide band frequency at its maximum without the loss of input signals.

Another object of the present invention is to provide an impedance matching circuit which can compensate for the decrease of video signals within a wide band frequency range.

Another object of the present invention is to provide an impedance matching circuit which can compensate at its maximum the decrease of red, green and blue video input signals due to the time constant of a resistance and a capacitance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the object of the present invention, as embodied and broadly described, an impedance matching circuit of a display device having a video input unit for inputting video signals R, G, B supplied from an external device via a signal cable; a video amplifying unit for amplifying the video signals supplied from the video input unit; and an impedance matching circuit connected between the video input unit and the video amplifying unit, for compensating for the decrease of the video signals R, G, B supplied from the external device, comprises a first resistor connected to the video input unit; a capacitor connected in series with the first resistor and connected to the video amplifying unit; and at least second resistors connected in series between a connecting point of the first resistor and capacitor and ground.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 6 is a table showing the impedance features when each circuit of FIGS. 5A–5F is applied.

DETAILED DESCRIPTION OF PREFERRED EMBODIMENT

Reference will now be made in detail to the preferred embodiments of the present invention examples of which are illustrated in the accompanying drawings.

Figure 1:
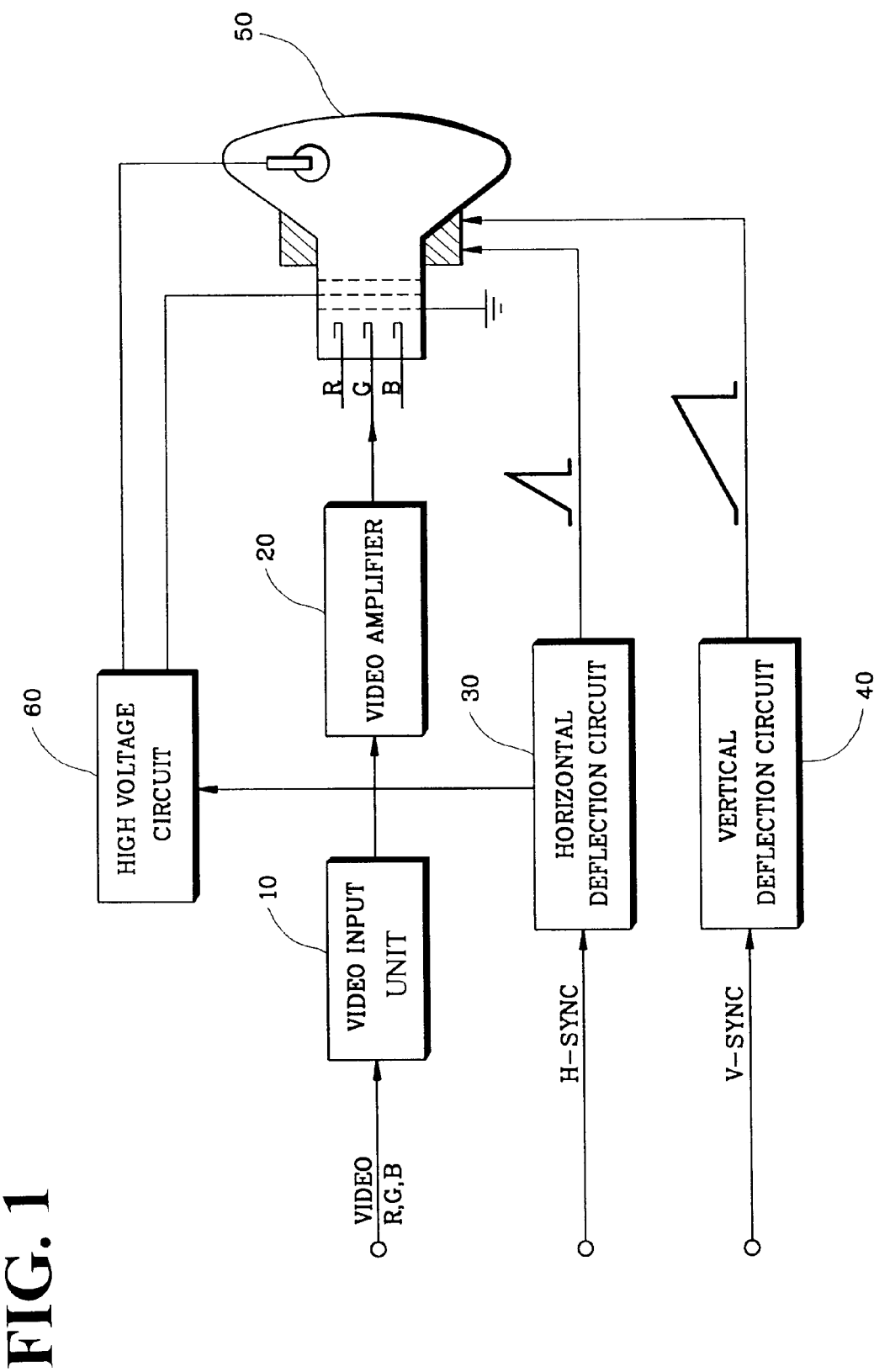
FIG. 1 is a block diagram showing a monitor.

FIG. 1 is a block diagram showing a monitor.

The monitor uses a video input unit 10 for inputting video signals R, G, B generated by a video card in a computer (not shown) and transmitted via a signal cable; a video amplifier unit 20 for amplifying the video signals supplied via the video input unit 10 and for transmitting them to a CRT 50; horizontal and vertical deflection circuits 30 and 40 for respectively inputting a horizontal synchronization signal H-Sync and a vertical synchronization signal V-Sync transmitted via the signal cable and for performing horizontal and vertical deflection to cause the electron beam generated by an electron gun of the CRT 50 to be sequentially deflected from the left upper portion to the right lower portion of the CRT 50 by a deflection yoke and thus to form an image like a photograph; and a high voltage circuit 60 for supplying high voltage to an anode terminal of the CRT 50 by using a blanking pulse generated by an output terminal of the horizontal deflection circuit 30 using a switching circuit principle and a high voltage technique.

Figure 2A:
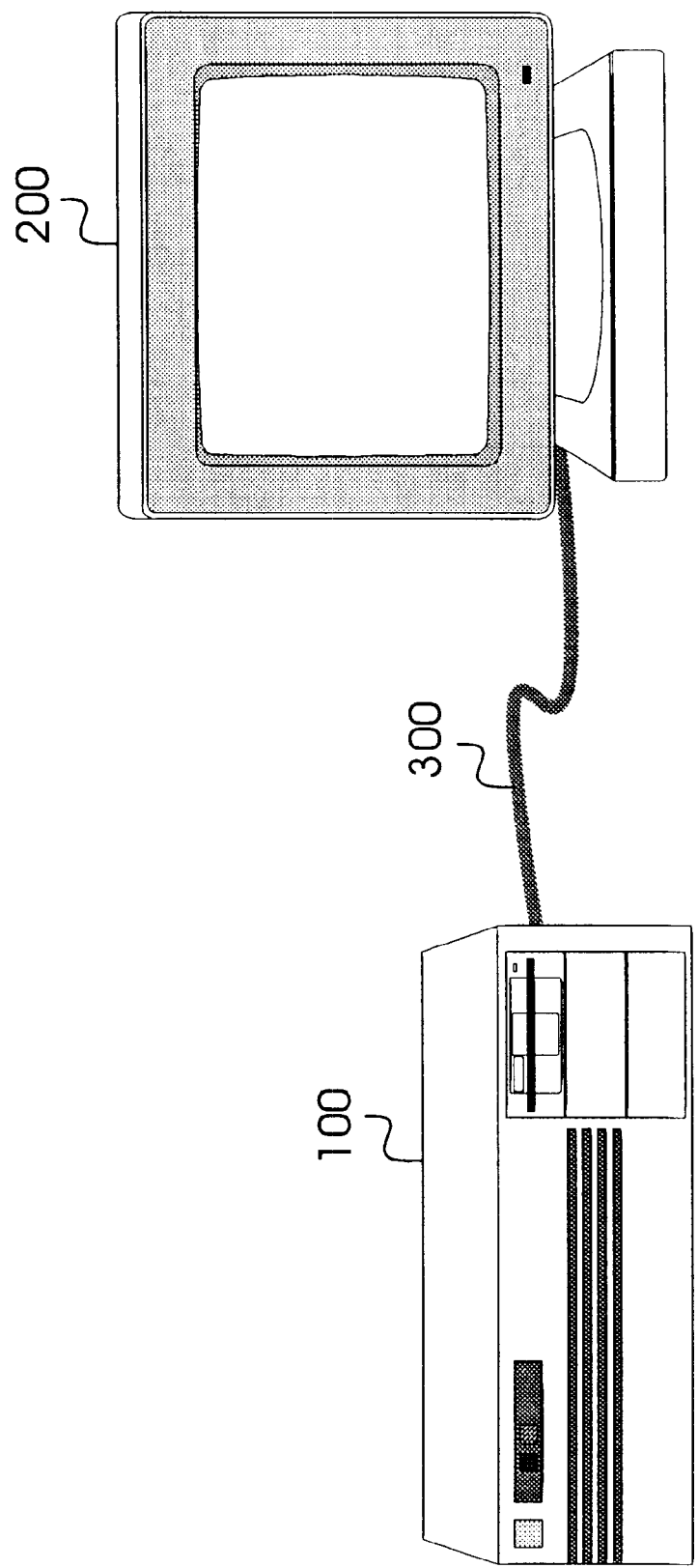
FIG. 2A is a diagram showing a computer connected to a monitor.

FIG. 2A shows a display controller, i.e. a computer 100 connected to a monitor 200 via a signal cable 300 for transmitting image signals and synchronization signals. A coaxial cable is typically used for the signal cable to suppress the radiation of electromagnetic waves and to prevent the signal from decreasing. Conceptually, five connection cables (for three primary colas R, G, B and vertical and horizontal synchronization) are required between the computer 100 and the monitor 200. The vertical and horizontal synchronization signals are separately input or the vertical and horizontal synchronization signals are combined. Sometimes, the video signal and the synchronization signal are combined, and it is referred to as Sync On Video (in case of monochrome displays) or Sync On Green (in case of color displays, the synchronization signal is typically combined with a green signal).

When an image is output on the monitor 200 by using the signal supplied from the computer 100, the computer may have various high frequency outputs and low frequency outputs corresponding to the frequency change according to the video card therein.

Figure 2B:
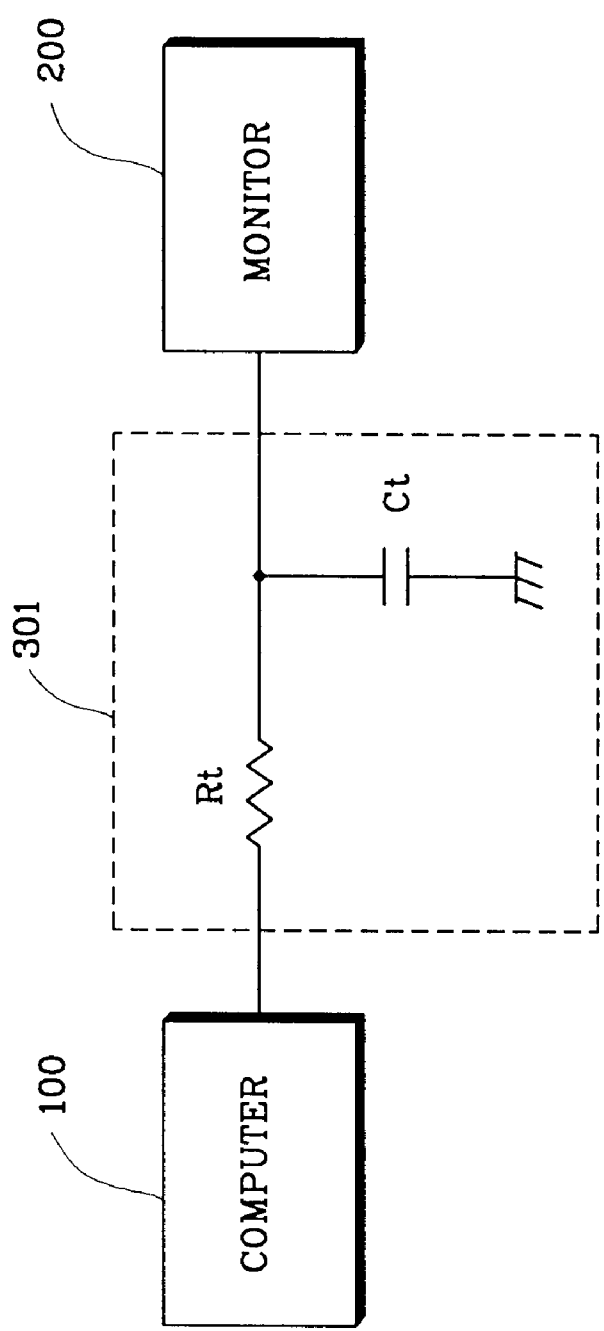
FIG. 2B is a block diagram showing an impedance generated by a signal cable of FIG. 2A.

FIG. 2B is a block diagram showing an impedance generated by the signal cable of FIG. 2A. The signal cable 300 between the computer 100 and the monitor 200 has a resistance component. Generally, the resistance component for a signal is referred to as an impedance. That is, the impedance represents the loss and decreasing of signals like a resistor make the current flow difficult.

The signal cable 300 has a signal decreasing impedance unit composed of a resistance Rt and a capacitance Ct. The signal decreasing effect in a high frequency band makes it difficult to show the original feature of the display device.

That is, with the passage of time, the response signal decreases exponentially. This exponential function can explain the decreasing of reverberation at a sound hall, the decreasing of bell sound, the emission of heat inside the electric circuit. The resistance R and the capacitance C are important constants for determining the decreasing curve and their product are referred to as time constants.

That is, the decreasing curve is changed so as to be gentle or steep according to the size of the time constant. The actual output waveform is an integral waveform of a square wave. Thus, a high pass RC circuit is also referred to as an integrator circuit. Referring to the curve form of the frequency, the portion inclined to a low frequency corresponds to the integrator effect. A specific frequency of a frequency feature curve is a reciprocal of the time constant which is a basis of a pulse response thereto.

Figure 3:
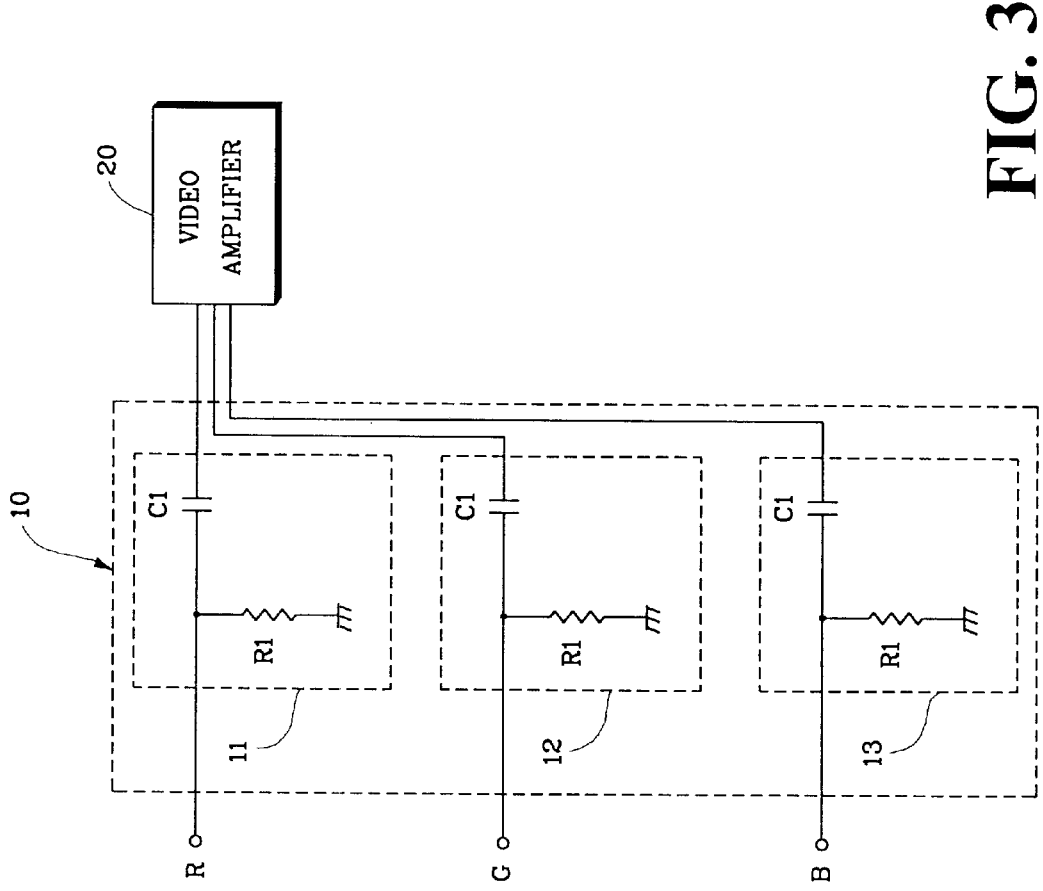
FIG. 3 is a circuit diagram showing an earlier video input unit.

In most cases, this phenomenon appears when connecting circuits because the signal output transfer is decreased as the signal current flows. Therefore, an impedance matching circuit for compensating for the signal attenuation due to the impedance is provided between the video input unit 100 and a video amplifier 20. FIG. 3 shows an earlier video input unit using a plurality of impedance matching circuits.

As shown in FIG. 3, the impedance matching units 11, 12 and 13 are respectively supplied with red, green and blue signals, thus compensating for the decrease of the video signals supplied to the video amplifying unit 20. The impedance matching units 11, 12 and 13 are respectively attached to the video signal terminals R, G and B. However, such an impedance matching circuit has a problem because it can achieve a proper impedance matching effect when the video frequency band is below 200 mega Hertz (MHz), but the compensating effect is remarkably reduced when the video frequency band is over 200 mega-Hertz.

Figure 4:
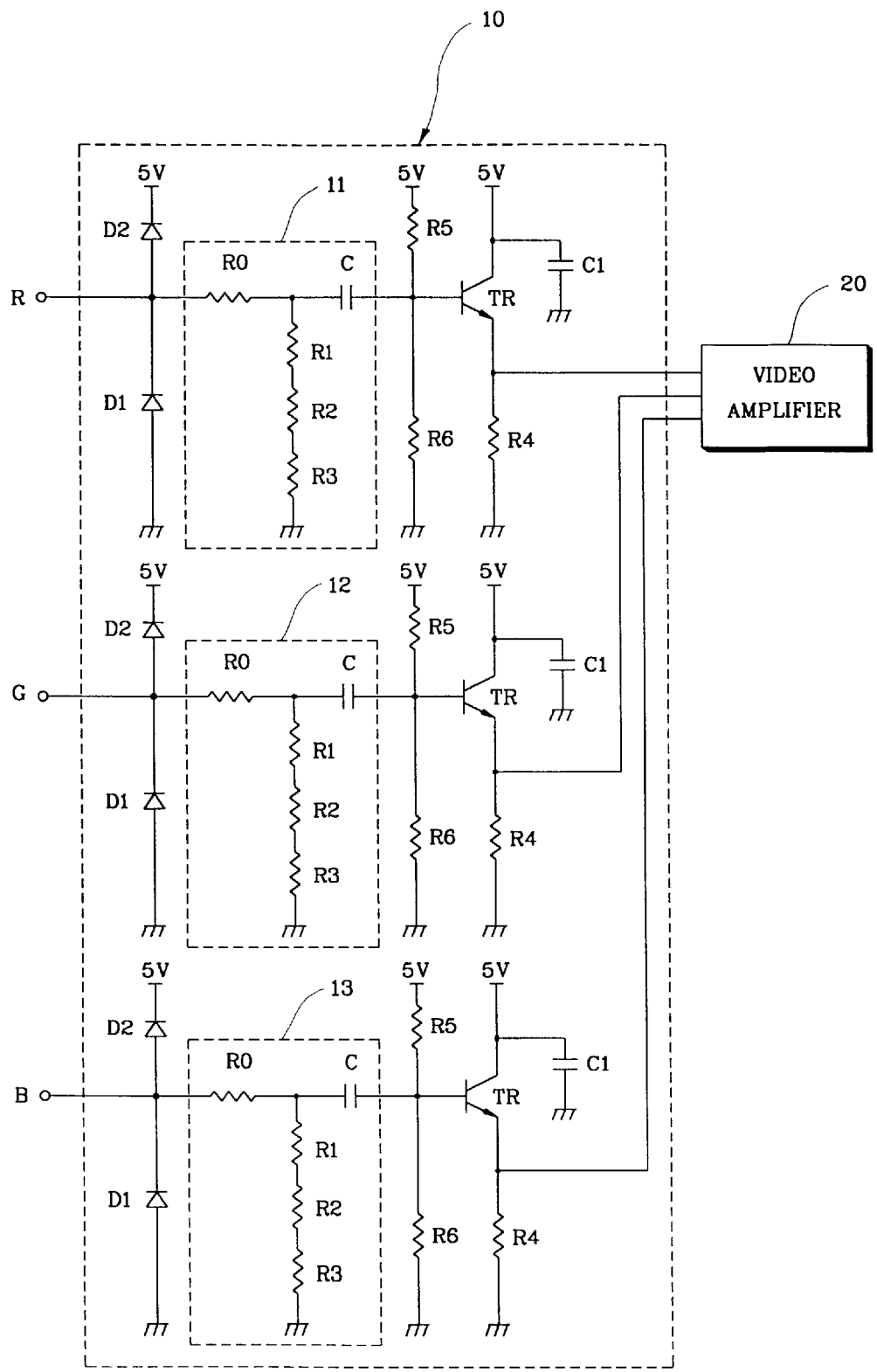
FIG. 4 is a circuit diagram showing a video input unit according to the present invention.

The impedance matching circuits 11, 12, 13 of FIG. 4 have a different structure as compared with the earlier impedance matching circuits. That is, reverse voltage preventing diodes D1 and D2 and a first resistor R0 are connected to a video signal input terminal, and a capacitor C, connected in series with the first resistor R0, is used to transmit the signals to a video amplifying unit 20. In this case, a second resistance is provided between a connecting point of the first resistor R0 and capacitor C and a ground, and in the present, three resistors R1, R2, and R3 are provided for the second resistance.

Voltage dividing resistors R5 and R6 are connected to the capacitor C. A transistor TR has a base connected to the junction of the voltage dividing resistors R5 and R6, an emitter connected to a resistor R4 and a collector connected to a capacitor C1. Such an impedance matching circuit is identically applied to each video signal input terminal R, G, B.

FIGS. 5A–5F show various types of an impedance matching circuits according to the present invention. As shown in the figures, the impedance matching unit shown in FIG. 5A has a resistor R1 and a capacitor C, and that shown in FIG. 5B further has a resistor R2 connected in series with the resistor R1. Each of the impedance matching units of FIGS.

5C to 5F has a first resistor R0 connected to a signal input terminal, a capacitor C connected in series between the first resistor R0 and a signal output terminal and a second resistor Rt connected between the connecting point of the first resistor R0 and capacitor C and ground. In this case, the second resistor Rt of FIGS. 5C to 5F may vary from one to four resistors R1 to R4. The value of the first resistor R0 used at the impedance matching units of FIGS. 5C to 5F is greater than the resistance value Rn of the signal cable. In addition, the value of the first resistor R0 is smaller than ⅓ of the second resistor Rt value, and the total value of the first and second resistors R0 and Rt is about 75 Ω with an error range of 10%. For example, when the first resistor R0 is 10 Ω and the second resistor Rt is 22 Ω, the impedance matching effect can be increased.

FIG. 6 is a table showing the impedance features of various impedance matching units of FIGS. 5A–5F. In the table, the impedance features according to various type of frequency ranges are represented as normal(Δ), good(○) and very good(◎). As shown in FIG. 6, in the case that the frequency band is below 200 mega-Hertz (MHz), the impedance matching effect is very good in all structures, however, in the case that the frequency band is between 200 mega-Hertz and 230 mega-Hertz, the structures have different impedance matching effects.

Figure 5A:
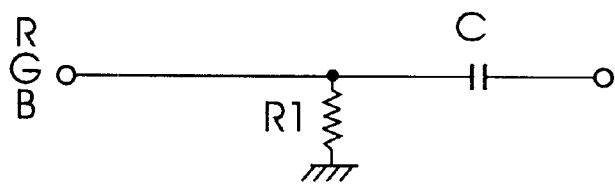
FIGS. 5A–5F are circuit diagrams showing an impedance matching unit of FIG. 4.
Figure 5B:
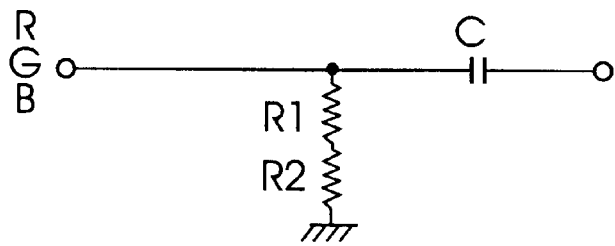
Figure 5C:
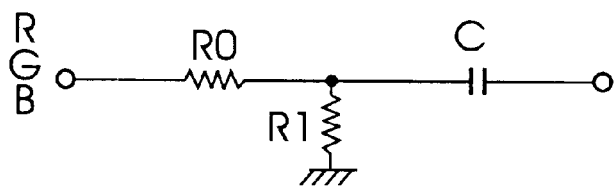
Figure 5D:
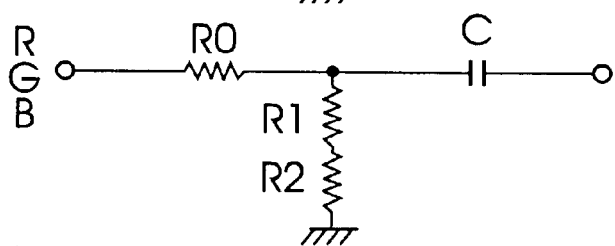
Figure 5E:
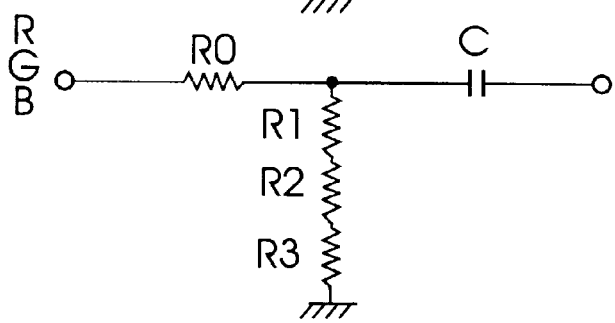
Figure 5F:
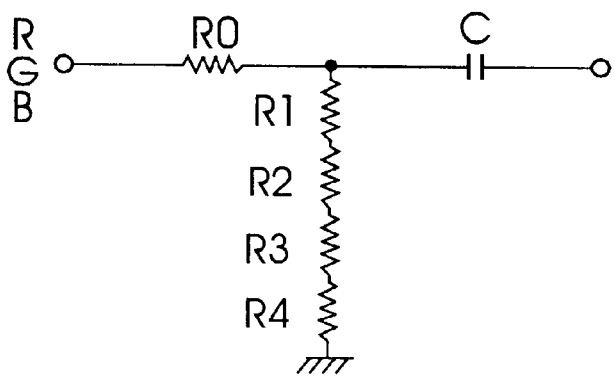

The impedance matching units of FIGS. 5A and 5B which do not have the first resistor R0 have normal impedance matching effect, and the impedance matching units of FIGS. 5C and 5D which have the first resistor R0 and the second resistor Rt composed of one resistor R1 or two resistors R1 and R2 show comparatively good characteristics. The impedance matching unit of FIG. 5E which has the first resistor R0 and the second resistor Rt composed of three resistors R1, R2, R3 shows very good characteristics, and the impedance matching unit of FIG. 5F which has the first resistor R0 and the second resistor Rt composed of four resistors R1, R2, R3, R4 shows comparatively good characteristics.

As described above, with the impedance matching circuit having the first and second resistors R0 and Rt and the capacitor, it is possible to compensate for the decrease of frequency feature at a high frequency band, especially over 200 mega-Hertz (MHz). It will be apparent to those skilled in the art therefore, that various modifications and variations can be made in the impedance matching units of the present invention without departing from the spirit or scope of the invention. Thus, it is intended that the present invention cover the modifications and variations of this invention provided they come within the scope of the appended claims and their equivalents.

What is claimed is:

1. An impedance matching circuit connected to a high frequency band video input signal terminal, comprising:
    a video input unit disposed to receive high frequency band video signals from said input signal terminal;
    a signal cable operationally coupled to said video input unit;
    a video amplifying unit; and
    an impedance matching circuit connected between said video input unit and said video amplifying unit, said impedance matching circuit comprising:
        a first resistor connected to said video input unit;
        a capacitor connected in series at a junction with said first resistor and connected to said video amplifying unit; and
        a plurality of second resistors connected in series between said junction and a reference potential.

2. The circuit as claimed in claim 1, said first resistor having a resistance which is smaller than one-third of a total resistance value of said plurality of second resistors.

3. The circuit as claimed in claim 2, said first resistor having a resistance which is greater than the resistance value generated by said signal cable which transmits said video signals to said video input unit.

4. The circuit as claimed in claim 1, said at least two second resistors comprising three resistors.

5. An impedance matching circuit for transmitting signals from an input signal terminal to an output terminal without any transformation and for minimizing signal attenuation, comprising:
    an impedance matching circuit connected to a high frequency band video input signal terminal;
    a first resistor connected to said input signal terminal;
    a capacitor connected in series with said first resistor and connected to said output terminal;
    at least two second resistors connected in series between a connecting point of said first resistor and capacitor and ground.

6. The impedance matching circuit as claimed in claim 5, with said first resistor having a resistance which is smaller than one-third of a total resistance value of said at least two second resistors.

7. The impedance matching circuit as claimed in claim 6, with said first resistor having a resistance greater than an input impedance value of said input terminal.

8. The impedance matching circuit as claimed in claim 5, with said at least two second resistors comprising three resistors.

* * * * *